United States Patent
Jollie et al.

(10) Patent No.: US 7,941,334 B2
(45) Date of Patent: May 10, 2011

(54) SUPPLIER PLANNING INFORMATION WAREHOUSE

(75) Inventors: Edward Jollie, New Windsor, NY (US); Paul J. Markowski, Poughkeepsie, NY (US); Stephen T. McDonald, Staatsburg, NY (US); Michael P. Murray, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 2194 days.

(21) Appl. No.: 09/974,377

(22) Filed: Oct. 10, 2001

(65) Prior Publication Data

US 2003/0069775 A1 Apr. 10, 2003

(51) Int. Cl.
  *G05B 19/418* (2006.01)
  *G06F 9/46* (2006.01)
(52) U.S. Cl. ...................................... 705/7.25
(58) Field of Classification Search .............. 705/10, 705/8
  See application file for complete search history.

(56) References Cited

U.S. PATENT DOCUMENTS

| | | | | |
|---|---|---|---|---|
| 5,963,919 A | * | 10/1999 | Brinkley et al. | 705/28 |
| 6,157,915 A | * | 12/2000 | Bhaskaran et al. | 705/7 |
| 6,442,554 B1 | * | 8/2002 | Reddy et al. | 707/100 |
| 6,711,550 B1 | * | 3/2004 | Lewis et al. | 705/10 |
| 6,816,839 B1 | * | 11/2004 | Gung et al. | 705/10 |
| 6,889,197 B2 | * | 5/2005 | Lidow | 705/10 |
| 2002/0138324 A1 | * | 9/2002 | Zarefoss et al. | 705/8 |
| 2003/0018546 A1 | * | 1/2003 | Ayala et al. | 705/28 |
| 2003/0033180 A1 | * | 2/2003 | Shekar et al. | 705/7 |

OTHER PUBLICATIONS

Porter et al, Manufacturing classifications: relationships with production control systems, Integrated Manufacturing Systems, v10n4, pp. 189-198, 1999. DIALOG File 15.*

Kiely, Daniel A, Synchronizing supply chain operations with consumer demand using customer data, Journal of Business Forecasting Methods & Systems, v17n4, pp. 3-9, Winter 1998/1999. DIALOG File 15.*

* cited by examiner

*Primary Examiner* — Andre Boyce
(74) *Attorney, Agent, or Firm* — Gibb I.P. Law Firm, LLC

(57) ABSTRACT

A method and structure for coordinating materials ordering requirements for multiple divisions of an organization, comprises a merging unit in communication with the divisions of the organization, wherein the divisions supply the merging unit with parts demand data and wherein the divisions produce the parts demand data utilizing independent demand calculation systems. An information warehouse is connected to the merging unit. The merging unit combines the parts demand data from the divisions to produce an overall demand data for parts needed by the organization.

10 Claims, 3 Drawing Sheets

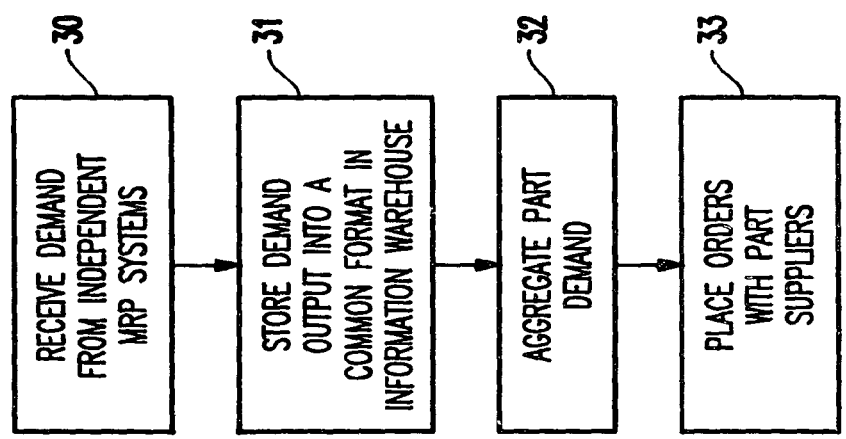

SUPPLIER PLANNING INFORMATION WAREHOUSE

BACKGROUND OF THE INVENTION

1. Field of the Invention

The present invention generally relates to Materials Requirement Planning (MRP) systems and more particularly to an improved MRP system that includes an information warehouse that centralizes the materials order planning process for all business divisions of a corporation.

2. Description of the Related Art

With the increasing complexity and delivery expectations of today's supply chain, it is crucial that the Materials Requirements Planning (MRP) process evolve to be effective and accurate in the e-business environment. Component availability can have major impacts on delivery measurements as well as revenue impacts.

FIG. 1 illustrates a conventional parts ordering and supply system. The term "parts" is used herein as a shorthand term for all items that are purchased by a business entity to operate its business and manufacture items and includes, for example, materials, elements, assemblies, tools, supplies, labor, and energy.

In FIG. 1, a business entity 140 is shown to include multiple business units 130-132. In this example, three business units 130-132 are shown; however, as would be known by one ordinarily skilled in the art, the business entity 140 can include any number of business units. The business units 130-132 are generally distinguished from one another by physical location, function, product makeup, etc. Business unit L and business unit M include individual automated systems for calculating the parts that will be required to meet product demand. These units are identified as materials requirement planning (MRP) systems 135, 136. Business unit N does not include an MRP unit. To the contrary, business unit N calculates its demand using manual or other semi-automated systems.

The MRP systems 135, 136 generally operate by exploding the finished products manufactured by the business entity 140 into component parts. These exploded component parts are then multiplied by the number of finished products needed to determine the demand for the component parts that must be ordered from parts suppliers 110-112. The MRP systems 135, 136 not only automatically calculate the demand for component parts that are necessary, but such systems can also place the orders directly with the various parts suppliers 110-112.

As shown in FIG. 1, each business unit (and more particularly, each MRP unit 135, 136) operates independently when ordering parts. Therefore, each business unit independently places orders with the different parts suppliers 110-112 and the assembly suppliers 120, 121. Therefore, for example, business unit N (132) individually places orders with parts supplier C (112) and assembly supplier G (121).

The assembly suppliers manufacture pre-assembled items that are utilized by the business units 130-132. Some of these assembly suppliers may purchase parts from the same part suppliers that the business units use and may also purchase parts that other assembly suppliers use. For example, business unit M (131) purchases parts from parts supplier B (111). In addition, both assembly supplier F (120) and assembly supplier G (121) also purchase parts from parts supplier B (111). In some instances, all three of the ordering entities (120, 121, 130) may be purchasing the same part from supplier B (111); however, because the various entity ordering systems are not coordinated, each entity orders individually. Part suppliers generally provide volume discounts, whereby a purchasing entity is provided with a lower price for purchasing a larger volume. Therefore, by coordinating the purchasing needs of the different business units 130-132 and the different assembly suppliers 120-121, the business entity 140 may be able to obtain additional price reductions for parts purchases.

However, a number of obstacles stand in the way of coordinating such purchasing information. For example, the different MRP systems 135, 136 are usually developed independently and are, therefore, not readily compatible with one another. In addition, many business units (such as business unit N) may not utilize automated demand/ordering systems. Further, different MRP systems may be run at variable times based on business conditions and individual business situations. When the latest data is available, it is difficult to capture and requires extensive manual intervention to even try to keep any individual or aggregated information up to date in a conventional system.

Alternatively, the business entity 140 may attempt to establish a single MRP system for all business units within the business entity 140, or require that all business units utilize the same, consistent MRP application. This has numerous drawbacks, including the extensive development costs to integrate. Further, running multiple MRP systems can introduce errors and tie up resources. Also, requirements of synchronous running become exponentially complex as more MRP systems are added.

SUMMARY OF THE INVENTION

In view of the foregoing and other problems, disadvantages, and drawbacks of the conventional MRP systems, the present invention has been devised, and it is an object of the present invention to provide a structure and method for an improved MRP system that includes an information warehouse.

In order to attain the object(s) suggested above, there is provided, according to one aspect of the invention, a system for coordinating materials ordering requirements for multiple divisions of an organization. The invention includes a merging unit in communication with the divisions of the organization. The divisions supply the merging unit with parts demand data and the divisions produce the parts demand data utilizing independent demand calculation systems. An information warehouse is connected to the merging unit. The merging unit combines the parts demand data from the divisions to produce an overall demand data for parts needed by the organization.

This invention uses an event triggered system that eliminates the problem of keeping the most current MRP data in the warehouse. When any local MRP system is run, that event will automatically trigger a feed of new MRP data to the warehouse. The invention uses location profiles to pick up timely requirements from the different locations.

The independent demand calculation systems include automated materials planning requirements (MRP) systems. The independent demand calculation systems also include non-MRP systems. The information warehouse consolidates parts orders made to part suppliers for multiple divisions of the organization. The divisions supply the parts demand data to the merging unit in a consistent, predetermined format. The parts demand data includes assembly elements required by assembly suppliers. The information warehouse consolidates parts orders made to parts suppliers for multiple divisions of the organization and for the assembly suppliers.

BRIEF DESCRIPTION OF THE DRAWINGS

The foregoing and other objects, aspects and advantages will be better understood from the following detailed description of preferred embodiments of the invention with reference to the drawings, in which:

FIG. 3 is a flow diagram illustrating a preferred method of the invention.

DETAILED DESCRIPTION OF PREFERRED EMBODIMENTS OF THE INVENTION

Companies that are made up of multiple sites (business units), and even more so, those who out-source many manufacturing aspects, can benefit greatly by being able to maintain a view of their aggregated components requirements. Two major benefits of the capability to create a "complete" aggregated demand statement are supply chain conditioning and price leveraging. Such an ability will also affect inventory and customer responsiveness.

Long term conditioning will allow the company to keep component suppliers aware of their long term demands and assure capacity to meet these requirements. Corrective actions to meet demands can be taken well in advance of the actual projected need to ensure fulfillment of all requirements.

Figure 1:
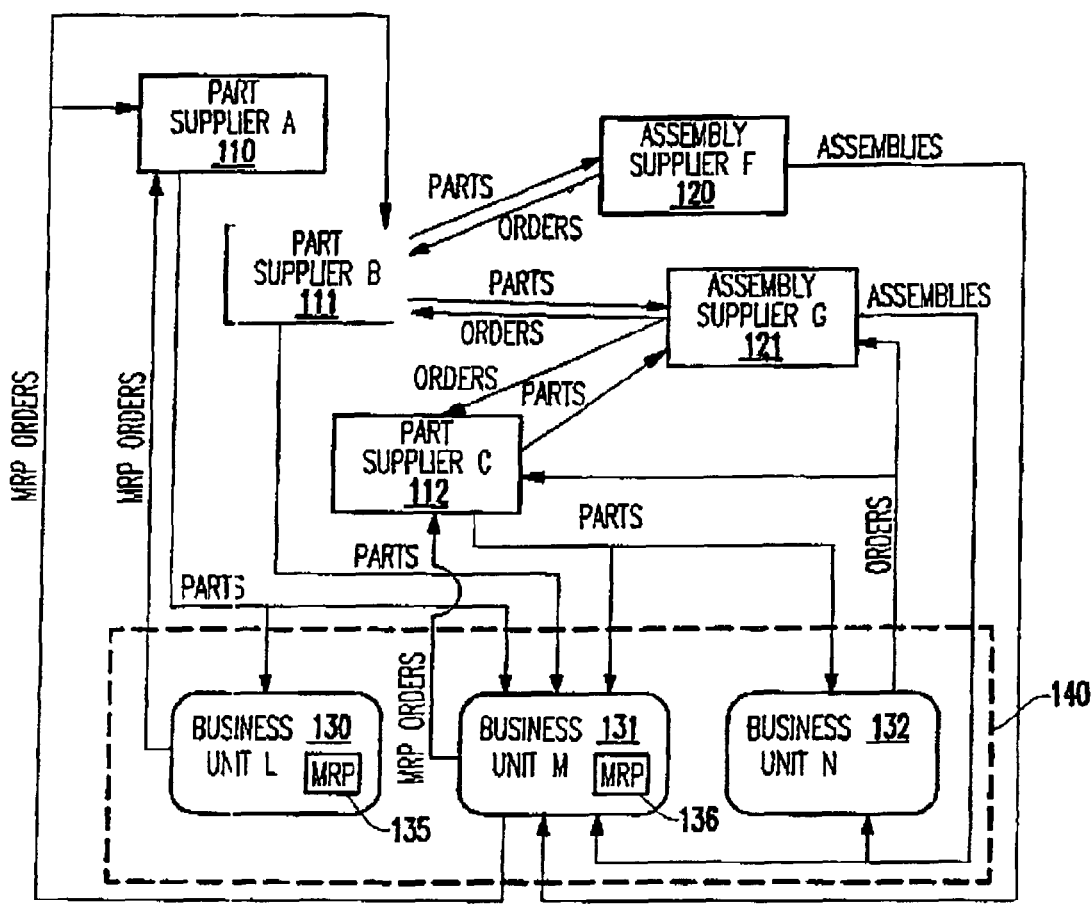
FIG. 1 is a schematic diagram of a parts ordering and supply system.
Figure 2:
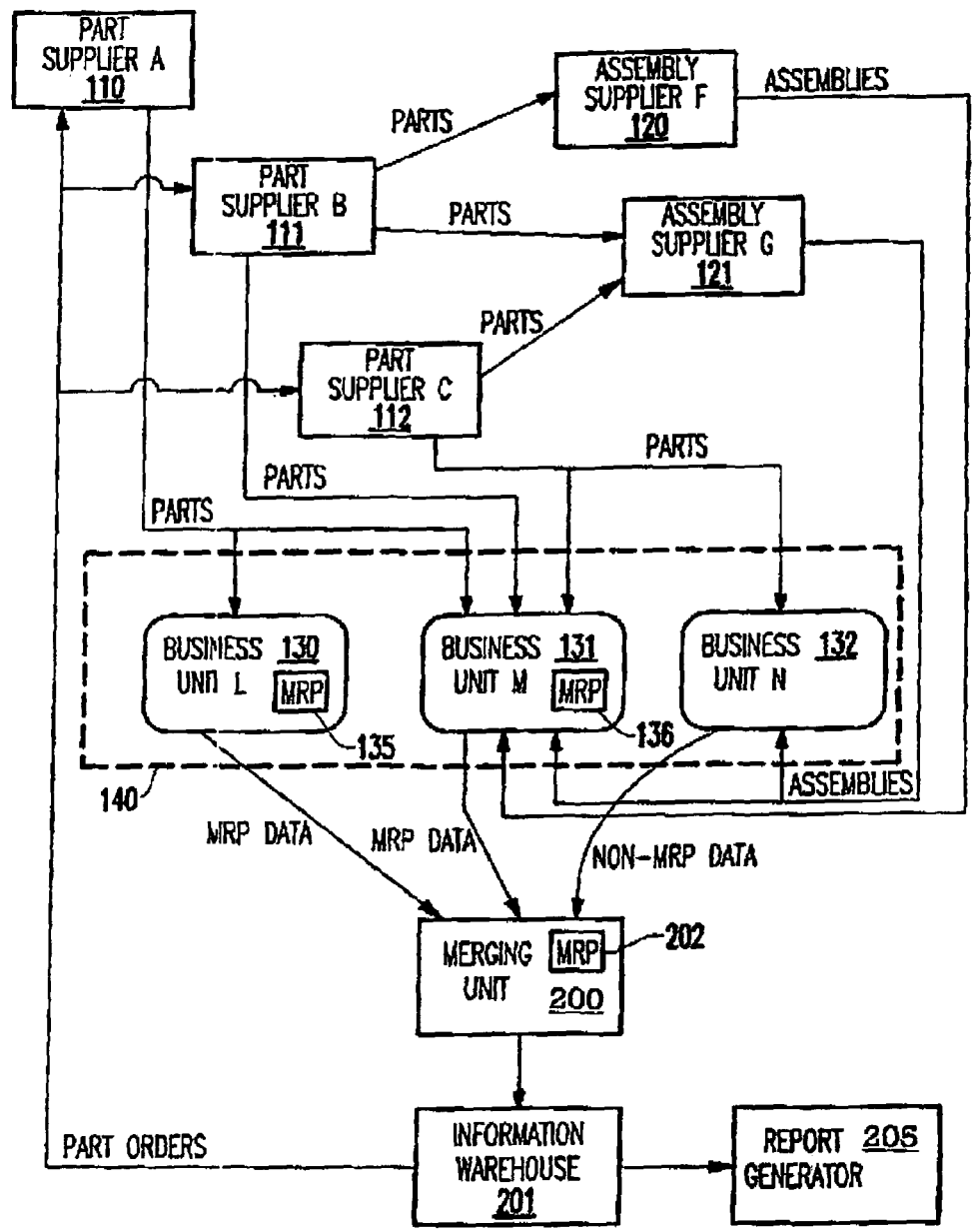
FIG. 2 is a schematic diagram of a parts ordering and supply system according to the invention.

The present invention provides the ability to aggregate the various demand components of different business units using a system that combines the output of independent MRP systems and of non-automated systems (e.g., business unit N) by utilizing a merging unit 200 that combines such demand data and organizes the same within an information warehouse 201, as shown in FIG. 2. The business units 130-132, parts suppliers 110-112, and assembly suppliers 120, 121 are discussed above in detail with respect to FIG. 1. However, the invention is different than the system shown in FIG. 1 because, with the invention, the information warehouse 201 coordinates all part ordered demand requirements of the business units 130-132 and the assembly suppliers 120, 121.

The merging unit 200 can accept data from non-compatible MRP units 135, 136 and from business units that do not have MRP data (e.g., manual and semi-automated systems) over a computerized network. The merging unit 200 accomplishes this task by simply requiring that each of the different MRP units (and non-MRP business units) provide certain pieces of data in a predetermined format (e.g., uniform feed). By utilizing a standard, consistent, predetermined input format, the merging unit 200 is able to consolidate the demand data from the various divergent systems that will supply such data. When any local MRP system is run, that event will automatically trigger a feed of new MRP data to the warehouse. The invention uses location profiles to pick up timely requirements from the different locations.

In addition, the merging unit 200 may also determine the various components that will be needed by the assembly suppliers 120, 121 to produce the assemblies that will be required by the business units 130-132. The merging unit 200 performs this function by including a specialized MRP 202 that explodes the assemblies into their constituent components and multiplies these components by the number of each respective assembly that will be needed.

The merging unit 200 categorizes and combines the different parts that are required in the information warehouse 201. In addition, the merging unit 200 may combine parts that are substitutes for one another, to increase the volume of each specific part and decrease the overall number of different parts that are needed. The information warehouse 201 is then able to provide parts orders to the part suppliers 110-112. Such parts orders are for parts required by all of the business units 130-132 and/or the assembly suppliers 120, 121. Therefore, with the invention, if one or more business units and/or one or more assembly suppliers require the same part (or a substitute part), larger quantities can be purchased from the part suppliers, thereby obtaining larger purchase volume discounts.

FIG. 3 illustrates a flowchart showing the processing occurring with the invention. More specifically, in item 30, the invention receives demand from the independent MRP systems 130-131. Next, in item 31, the merging unit 200 stores the demand output into a common format in the information warehouse 201. This aggregates the parts demand (as shown in item 32). With the invention, orders can be placed with parts suppliers (item 33) for all business units within a business entity as well as for the assembly suppliers who perform outsourcing work for the business entity.

By accepting feeds from all sites, the invention produces (for example, through the report generator 202) an aggregated demand picture that allows for a worldwide demand view for the business entity 140. The invention uses the business unit's existing MRP engines, whatever that may be, so that only consistently formatted feeds need to be established. Many different sites may be purchasing the same part and by knowing what the total is, procurement can price leverage with the suppliers based on these aggregated demands instead of individual sites receiving pricing based on their demands only. Even more so, visibility to components used in outsourced products (e.g., assemblies) is usually lost conventionally. Even though those parts are used on an assembly or product that is ultimately purchased by the company, there is no way conventionally to aggregate how many and what parts will be purchased from multiple vendors. The invention not only aggregates direct component demand but also allows coordination of component demand used by assembly suppliers. These volumes can then be included in the price leveraging activity resulting in greater volumes which, in most cases, translate into lower costs per piece.

Benefits of coordinating part demands of different business entities and assembly suppliers include legacy system reduction, operational cost reductions, common data source establishment, timeliness, and implementing a prerequisite for the integrated supply demand process. The intended usage of the data is to condition the supply line and also maximize volume leveraging by procurement. By having the most accurate forecast possible, aggregated from the entire corporation's component demands, the supply line can be conditioned for expected volumes and constraints can be minimized or eliminated prior to impact on meeting customer demands. Procurement can use this data to work with suppliers to evaluate their supply capability and reserve capacity, if necessary. Procurement can also use the forecast volumes in the negotiation of component prices. The aggregation of these parts across the corporation allows for increased leverage at obtaining the best pricing.

By accepting feeds from all sites, the invention produces (for example, through the report generator 205) an aggregated demand picture that allows for a worldwide demand view for the business entity 140. The invention uses the business unit's existing MRP engines, whatever that may be, so that only consistently formatted feeds need to be established. Many different sites may be purchasing the same part and by knowing what the total is, procurement can price leverage with the suppliers based on these aggregated demands instead of individual sites receiving pricing based on their demands only. Even more so, visibility to components used in outsourced products (e.g., assemblies) is usually lost conventionally. Even though those parts are used on an assembly or product that is ultimately purchased by the company, there is no way conventionally to aggregate how many and what parts will be purchased from multiple vendors. The invention not only aggregates direct component demand but also allows coordination of component demand used by assembly suppliers. These volumes can then be included in the price leveraging activity resulting in greater volumes which, in most cases, translate into lower costs per piece.

This invention approaches the problem using data warehousing technology that pulls the most current outputs of various MRP systems, massages and manipulates the specific output into a commonly designated format, and stores the manipulated data into a common database. This common database is then used to aggregate the total demand from the disparate MRP systems. The data may not be entirely synchronized all of the time depending on the independent operation of the individual MRP systems, but it is accurate enough to give the benefit of a fully synchronized approach. Over time, as the individual MRP systems become more synchronized, the accuracy of the aggregated demand increases. The aggregated demand is not gated by any one MRP system. Furthermore, this provides a nice migration path so that MRP systems can be added incrementally until all of the demand is aggregated.

The invention uses event driven triggers that ensure that the most current information is in the warehouse, and minimizes any cascading which is problematic for most MRPs. The invention provides an enterprise wide aggregated statement of demand as both orderer and supplier. The invention also provides current information for price leveraging activity. Further, the invention can support the flow of MRP requirements at the enterprise, division, business unit, or production/brand level. The invention allows the user to incorporate both internal and external parts requirements.

While the invention has been described in terms of preferred embodiments, those skilled in the art will recognize that the invention can be practiced with modification within the spirit and scope of the appended claims.

What is claimed is:

1. A method for aggregating demand from multiple demand calculation systems running independently, said method comprising:
    receiving, by a merging unit, parts demand data output from at least two independent demand calculation systems for at least two divisions of an organization,
        wherein said independent demand calculation systems comprise automated materials requirements planning-(MRP) systems, and
        wherein feeding of said parts demand data from said independent demand calculation systems to said merging unit is automatically triggered by running of said independent demand calculation systems such that the most current parts demand data is received;
    aggregating said parts demand data from said at least two independent demand calculation systems to produce an overall demand data for parts needed by said organization; and
    storing said overall demand data in an information warehouse in a common format.

2. The method in claim 1, wherein said independent demand calculation systems also include non-MRP systems.

3. The method in claim 1, further comprising consolidating parts orders made to part suppliers for said divisions of said organization based on said overall demand data for parts.

4. The method in claim 1, wherein said receiving further comprises receiving said parts demand data in a consistent, predetermined format.

5. The method of claim 1, wherein said receiving of said parts demands data comprises receiving demands for assemblies and wherein said method further comprises determining assembly elements required by assembly suppliers that supply said assemblies to said divisions.

6. The method in claim 5, further comprising consolidating parts orders made to parts suppliers for said divisions of said organization and for said assembly suppliers based on said overall demand data for parts.

7. A method for aggregating demand from multiple demand calculation systems running independently, said method comprising:
    receiving parts demand data output from at least two independent demand calculation systems for at least two divisions of an organization,
        wherein said parts demands data comprises demands for assemblies,
        wherein said independent demand calculation systems comprise automated materials planning requirements (MRP) systems and non-MRP systems, and
        wherein feeding of said parts demand data from said independent demand calculation systems to said merging unit is automatically triggered by running of said independent demand calculation systems such that the most current parts demand data is received;
    determining assembly elements required by assembly suppliers that supply said assemblies to said divisions;
    aggregating said parts demand data from said at least two independent demand calculation systems to produce an overall demand data for parts needed by said organization; and
    storing said overall demand data in an information warehouse in a common format.

8. The method in claim 7, further comprising consolidating parts orders made to part suppliers for said divisions of said organization based on said overall demand data for parts.

9. The method in claim 7, wherein said receiving further comprises receiving said parts demand data in a consistent, predetermined format.

10. The method in claim 7, further comprising consolidating parts orders made to parts suppliers for said divisions of said organization and for said assembly suppliers based on said overall demand data for parts.

* * * * *